United States Patent [19]
Okazaki

[11] Patent Number: 5,934,770
[45] Date of Patent: Aug. 10, 1999

[54] BRAKE CONTROL SYSTEM FOR AUTOMOTIVE VEHICLE

[75] Inventor: Haruki Okazaki, Hiroshima, Japan

[73] Assignee: Mazda Motor Corporation, Hiroshima, Japan

[21] Appl. No.: 08/721,962

[22] Filed: Sep. 27, 1996

[30]     Foreign Application Priority Data

Sep. 29, 1995 [JP]  Japan .................................. 7-252332

[51] Int. Cl.⁶ ..................................................... B60T 8/32
[52] U.S. Cl. ........................ 303/150; 303/149; 303/169; 303/148; 188/181 C; 701/75; 701/80
[58] Field of Search .................... 303/148, 150, 303/147, 149, 136, 154, 171, 172, 169, 173, 176, 199; 364/426.017, 426.018, 426.019, 426.016; 188/181 A, 181 C; 701/73, 74, 75, 72, 80

[56]               References Cited

U.S. PATENT DOCUMENTS

| | | | |
|---|---|---|---|
| 4,883,325 | 11/1989 | Shimanuki et al. | 303/176 |
| 5,058,018 | 10/1991 | Kuwana et al. | 303/149 |
| 5,123,715 | 6/1992 | Okubo | 701/80 |
| 5,171,070 | 12/1992 | Okazaki et al. | 303/176 |
| 5,173,860 | 12/1992 | Walenty et al. | 364/426.019 |
| 5,185,702 | 2/1993 | Okubo | 364/426.019 |
| 5,261,503 | 11/1993 | Yasui | 180/197 |
| 5,273,350 | 12/1993 | Yagi et al. | 303/154 |
| 5,362,139 | 11/1994 | Watanabe | 303/186 |
| 5,411,325 | 5/1995 | Tanaka et al. | 303/150 |
| 5,430,652 | 7/1995 | Fujioka | 364/426.018 |
| 5,466,054 | 11/1995 | Okazaki | 303/150 |
| 5,634,699 | 6/1997 | Ichikawa et al. | 303/150 |

*Primary Examiner*—Douglas C. Butler
*Attorney, Agent, or Firm*—Sixbey, Friedman, Leedom & Ferguson, PC; Gerald J. Ferguson, Jr.; Donald R. Studebaker

[57]                  ABSTRACT

An automobile brake control system, which applies braking force commonly to both driving wheels and restrictively controls the braking force when a specified difference occurs between a wheel speed of the driving wheel and a vehicle speed estimated based on wheel speeds of the front and rear wheels, controls, when the vehicle is traversing a split surface road, the braking force based on a wheel speed of a specific one of the driving wheels which is suffering a road surface frictional coefficient greater than another driving wheel, and corrects the vehicle speed to a lower speed according to a difference in road surface friction coefficients at the driving wheels.

9 Claims, 10 Drawing Sheets

BRAKE CONTROL SYSTEM FOR AUTOMOTIVE VEHICLE

BACKGROUND OF THE INVENTION

1. Field of the Invention

The invention relates to a brake control system for automotive vehicles of the type in which braking force is applied commonly to the right and left driving wheels of an automotive vehicle.

2. Brief Description of Related Art

Recent automotive vehicles have been equipped with anti-lock brake systems (ABS) which estimate a tendency of wheel lock during braking based on both vehicle speed and wheel speeds and control braking force to the wheels in order to provide more stable braking performance by eliminating possible skid.

Such an anti-lock brake system is structured in various types in regard to the number of wheel speed sensors and control channels, for example, a 4-sensor, 4-channel system type, a 4-sensor, 3-channel type and others as well. In a 4-sensor, 3-channel type of anti-lock brake system, employed in rear drive vehicles for example, front driven wheels are controlled through independent hydraulic control circuits based on wheel speeds detected by respective front wheel speed sensors, and rear driving wheels are, however, controlled through a common hydraulic control circuit based on consolidated data of wheel speeds from the rear wheel speed sensors. Such an anti-lock brake system is known in, for example, Japanese Unexamined Patent Publication No. 4-197864.

Further, anti-lock brake systems of a 3-sensor, 3-channel type or of a 2-channel type employing a cross-arrangement of pressure lines provide braking control commonly to the left and right driving wheels.

Because all of these anti-lock brake systems monitor the speed of each driving wheel, they permit more reliably what is called select-low braking control which refers to the fact that braking force is controlled to an appropriate level for either one of the driving wheels which tends to lock more easily than the other driving wheel or has tire torque smaller than the other driving wheel. The select-low braking control provides an reduction in yaw moment of the vehicle and, consequently, permits the driver to more easily maintain steering control for the stability of vehicle driving.

In cases where front-engine rear-drive vehicles are equipped with the automatic brake system of the type in which braking force is controlled commonly to right and left driving wheels, if the select-low braking control is executed when the vehicle is traversing a split surface road which imposes different road surface frictional coefficient on the left and right driving wheels (rear wheels), either one of the driving wheels suffering a road surface frictional coefficient smaller than the other will tend to be brought into a locked condition and the braking force to the wheels will be reduced consequently. As a result, because the remaining wheels are judged to have a tendency to be brought into a locked condition due to an increase in speed of the driving wheel suffering a higher road surface frictional coefficient, and hence an increase in vehicle speed estimated based on that wheel speed, braking force to each wheel is possibly decreased below a necessary level.

SUMMARY OF THE INVENTION

It is an object of the invention to provide an anti-lock brake control system which enhances high braking performance and reliability of braking force control even during execution of select-low braking control while the vehicle is traversing a split surface road.

The aforesaid object of the invention is achieved by providing a brake control system for an automotive vehicle of the type applying braking force commonly to both left and right driving wheels and restrictively controlling the braking force when a specified difference occurs between a wheel speed and a vehicle speed estimated based on wheel speeds, for example the highest wheel speed or an average speed, of front and rear wheels detected by means of speed monitors installed to the respective wheels. The brake control system controls braking force based on a wheel speed of a specific one of the driving wheels which is suffering a road surface frictional coefficient greater than another driving wheel, and varying the vehicle speed by a corrective decrement according to a difference between the road surface friction coefficients of said left and right driving wheels.

In cases where the vehicle is traversing a split surface road which imposes different road surface frictional coefficients on the left and right rear wheels of, for instance, a front-engine rear-drive vehicle, braking force is controlled based on either one of the left or right rear wheels suffering a lower road surface frictional coefficient which tends to be brought into a locked condition. As a result of the select-low braking control, the vehicle reduces its yaw moment sufficiently for the driver to control the tendency of the vehicle to turn through operation of the steering wheel, realizing enhanced driving stability of the vehicle.

Because the vehicle speed which is estimated based on the highest speed from among the all of the four wheels or the average speed of the four wheels and then, in order to execute the select-low braking control is corrected to a smaller speed according to a difference in the road surface frictional coefficients at the left and right driving wheels, it is prevented to make an inappropriate judgement that the wheels, other than the driving wheel suffering a higher road surface frictional coefficient, tend toward a locked condition due to an increase in the wheel speed of the one driving wheel and, as a result, to apply braking force decreased in level below the necessary level needed for optimum control to the other wheels, thereby providing more appropriate and desirable braking control while the vehicle is traversing a split surface road.

The vehicle speed may be corrected by a specified decrease which is larger when the difference between the road surface friction coefficients of a split surface road is larger as compared to when it is smaller. This correction of vehicle speed may be carried out only when a difference in road surface frictional coefficient at the left and right driving wheels exceeds a specific level with the effect of eliminating unnecessary braking force control and preventing the system hunting.

In order to estimate the vehicle speed more accurately, the wheel speed of the other driving wheel may be corrected according to a difference in road surface frictional coefficient at the left and right driving wheels prior to estimation of the vehicle speed based on the wheel speeds of all of the wheels including the other driving wheel.

In order to estimate the vehicle speed without being influenced by an increase in wheel speed of the other driving wheel which is caused due to a locking tendency of the one driving wheel suffering a lower road surface frictional coefficient, the vehicle speed may be estimated based on the wheel speeds excluding the corrected wheel speed of the other driving wheel when the difference in road surface friction coefficients at the left and right driving wheels is greater than a specific level.

Alternatively, the reference level of difference for restrictive control of the braking force may be raised when the difference in road surface friction coefficient at the left and right driving wheels is greater than a specified level. This causes the restrictive control of braking force timely to prevent the braking force from being lowered in excess.

BRIEF DESCRIPTION OF THE DRAWINGS

The above and other objects and features of the invention will be clearly understood from the following description with respect to preferred embodiments thereof when considered in conjunction with the accompanying drawings, in which.

DETAILED DESCRIPTION OF THE SPECIFIC EMBODIMENTS

Figure 1:
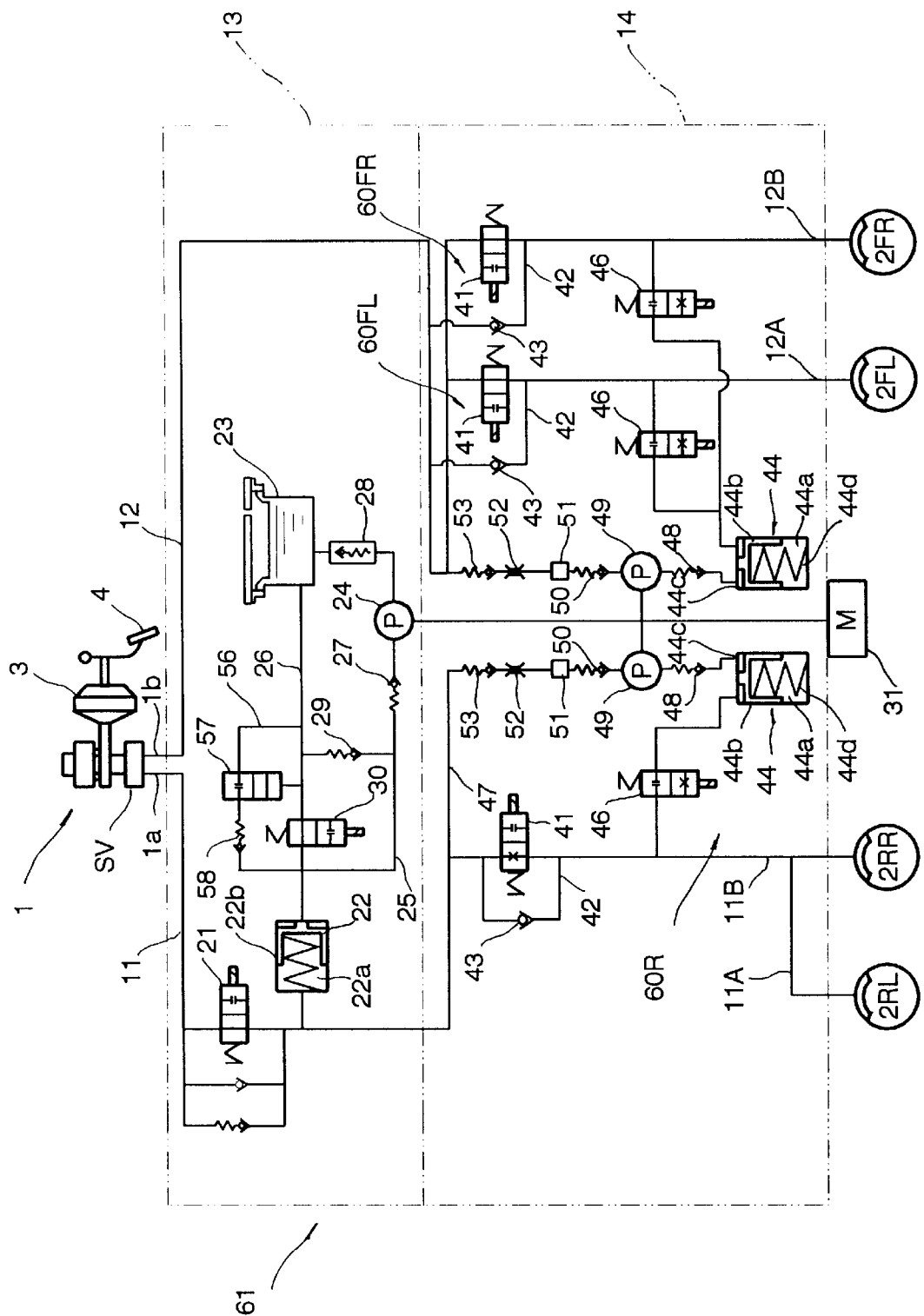
FIG. 1 is a schematic drawings of a hydraulic control circuit used for a brake control system of the invention.

Referring to the drawings in detail, in particular, to FIG. 1 which shows a hydraulic control circuit 100 commonly used in cooperation with brake systems according to various embodiments of the invention. The hydraulic control circuit 100 comprises a pressure adjusting circuits 13 and 14 for a traction control system and an anti-lock brake system, respectively.

Hydraulic control unit 61 includes a master cylinder 1, and wheel cylinders, namely a left front wheel cylinder 2FL, a right front wheel cylinder 2FR, a left rear wheel cylinder 2RL, and a right rear wheel cylinder 2RR. Master cylinder 1 is connected to foot brake pedal 4 through brake booster 3 which increases pressure in master cylinder 1 required to operate a brake system when brake pedal 4 is stepped on. Brake booster 3 may be, for example, an air or fluid type brake booster unit. Master cylinder 1 is a tandem type master cylinder equipped with two discharge ports 1a and 1b. The discharge port 1a is in communication with a brake pressure line 11 from which first and second branch brake pressure lines 11A and 11B branch off. These first and second branch brake pressure lines 11A and 11B are connected to the rear wheel cylinders 2RL and 2RR, respectively. The discharge port 1b is in communication with a brake pressure line 12 from which third and fourth branch brake pressure lines 12A and 12B branch off. These third and fourth branch brake pressure lines 12A and 12B are connected to the front wheel cylinder 2FL and 2FR, respectively. This brake pressure line layout forms a 2-line, 3-channel front-rear brake line system utilized for a rear drive vehicle. Traction control pressure adjusting circuit 13 is installed to the first brake pressure line 11 in the vicinity of the master cylinder 1, and anti-lock brake pressure adjusting circuit 14 is installed to the first and second brake pressure lines 11 and 12 in the vicinity of wheel cylinders 2RL, 2RR, 2FL and 2FR.

Traction control pressure adjusting circuit 13 includes an electromagnetic shut-off valve 21 installed to the first brake pressure line 11 at a location downstream from the master cylinder 1, and a pressurizer 22 installed to the first brake pressure line 11 at a location downstream from the electromagnetic shut-off 21. The pressurizer 22 is comprised of a cylinder 22a and a piston 22b which is received for reciprocating slide movement in the cylinder 22a and urged by a return spring 22b to return to a home position. An increase of the hydraulic pressure is produced by within the first brake pressure line 11 by forcing the piston 22b against the return spring 22c to change its position within the cylinder 22a.

Traction control pressure adjusting circuit 13 further incorporates a brake fluid reservoir tank 23 and a hydraulic pump 24 capable of discharging brake fluid into the pressurizer 22 from the reservoir tank 23. The pressurizer 22 is connected to a discharge port of the hydraulic pump 24 through a pressure supply line 25, and to the reservoir tank 23 through a pressure return line 26. A check valve 27 is installed to the pressure supply line 25 on the discharge side of the hydraulic pump 24 to allow hydraulic pressure fluid to flow only in a direction toward the pressurizer 22. Another check valve 28 is installed to the pressure supply line 25 on the inflow side of the hydraulic pump 24 to allow hydraulic pressure fluid to flow only toward the hydraulic pump 24.

Regulator valve 29 opens when the hydraulic pressure in the pressure supply line 25 exceeds a specific level to connect the pressure supply line 25 and the pressure return line 26 each other. An electromagnetic control valve 30 is installed to the pressure return line 26 at a point between the regulator valve 29 and the pressurizer 22. A normally closed regulator valve 57 and a check valve 58 are installed to a pressure return line 56 connecting the pressure supply line 25 and the pressure return line 26. This regulator valve 57 opens when it receives hydraulic pressure from the pressure return line 26. The check valve 58 opens when hydraulic pressure in the pressure supply line 25 exceeds a specific value to allow the hydraulic pressure to flow only in the direction from the pressure supply line 25 to the pressure return line 26.

The discharge pump 24 may be of a type driven by, for example, a DC motor 31. This motor 31 is used to drive hydraulic pumps 49, 49 of the anti-lock brake system as will be explained subsequently. While the motor 31 is operating to drive the discharge pump 24, hydraulic pressure applied to the pressurizer 22, which is used as traction control pressure, is controlled by means of duty-controlled operation of the control valve 30.

Anti-lock brake pressure adjusting circuit 14 incorporates a hydraulic circuit 60R which commonly supplies hydraulic pressure to the left and right rear wheel cylinders WRL and WRR. This hydraulic circuit 60R includes an electromagnetic pressure intensifying valve 41 installed to the first brake pressure line 11 at a point before the first brake pressure line 11 branches into the pressure lines 11A and 11B, and a bypass pressure line 42 installed to the first brake pressure line 11 so as to bypass the pressure intensifying valve 41. This bypass pressure line 42 is provided with a check valve 43 to allow hydraulic pressure to flow only in the direction toward the master cylinder 1. A pressure release line 45 provided with a reducing valve 46 connects the first brake pressure line 11 after the pressure intensifying valve 41 to a reservoir tank 44 and before the rear wheel cylinders 2RL and 2RR. The rear wheel cylinders 2RL and 2RR are connected to first and second branch lines 11A and 11B commonly through the valves 41 and 45. A pressure return line 47 connects the reservoir tank 44 to the first brake pressure line 11 at a point upstream from the pressure intensifying valve 41 and after the shut-off valve 21. The pressure return line 47 is provided, in order from the side of the reservoir tank 44, with a first check valve 48, a hydraulic pump 49, a second check valve 50, a pulsation suppression tank 51, an orifice 52 and a third check valve 53. The pressure return line 47 is connected commonly to the first and second branch pressure lines 11A and 11B as well as the reservoir tank 44. In this instance, the hydraulic pumps 24 and 49 are of a displacement type, such as a plunger-type displacement pump, that performs suction and discharge with a variation in volume.

Second brake pressure line 12 branches off into third and fourth branch pressure lines 12A and 12B which in turn lead to the left and right front wheel cylinders 2FL and 2FR, respectively. Hydraulic circuits 60FL and 60FR, which supply hydraulic pressure to the left front wheel cylinder 2FL and the right front wheel cylinder 2FR, respectively and each of which is similar in structure and operation to the hydraulic circuit 60R installed to the first brake pressure line 11, are independently installed to the third and fourth branch pressure lines 12A and 12B respectively. However, the drive motor 31 for the hydraulic pumps 49, the pressure return line 47 and the reservoir tank 44 are commonly used to the left and right front wheel cylinders 2FL and 2FR.

Each reservoir tank 44 is equipped with a piston 44b received for slide movement within a cylinder 44a. An accumulator chamber 44c, into which fluid pressure is supplied and from which it is withdrawn by means of movement of the piston 44b, is defined within the cylinder 44a. A return spring 44d is installed within the piston 44b on the side opposite the accumulator chamber 44c, thus forcing the piston 44b to move down as the accumulator chamber 44c is pressurized and consequently discharging fluid pressure from each wheel cylinder 2RL, 2RR, 2FL or 2FR. The spring force of the spring 44d, which is proportional to the pressure to be generated in the accumulation chamber 44c, is set at a level slightly higher than the resistance of fluid passage of the pressure return line 47. More specifically, the spring force of the spring 44d is set at a level slightly higher than the total operating pressure of these check valves 48, 50 and 53 to open, the operating pressure necessary for each check valve to open basically defining the passage resistance of the pressure return line 47. That is, the pressure generated within the accumulator chamber 44c is slightly greater than the total operating pressure of the check valves 48, 50 and 53. Resultingly, when brake pressure is not generated by the master cylinder 1, the fluid pressure remaining within the accumulation chamber 44c can be returned to the master cylinder 1 via the first brake pressure line 11 or the second brake pressure line 12 under the force of the spring 44 even when the motor 31, and hence the hydraulic pump 49, is not operating.

For rear drive vehicles, the anti-lock braking system causes first the shut-off valve 21 for traction control to open. While the shut-off valve 21 remains open, the anti-lock braking system provides three different brake pressure control modes, namely a pressure increasing mode, a pressure reducing mode and a pressure maintenance mode, independently for the left and right front wheel cylinders 2FL and 2FR and commonly to the left and right rear wheel cylinders 2RL and 2RR through controlled operation of the pressure intensifying valves 41 and the pressure reducing valves 46. The pressure amplification control is executed by closing the reducing valve 46 and opening the intensifying valve 42, and the pressure reduction control is executed by closing the pressure intensifying valve 41 and opening the reducing valve 46. Further, the pressure maintenance control is made through closing both reducing valve 46 and intensifying valve 41.

Brake pressure is discharged into the reservoir tanks 44 as a result of pressure reduction, and then, returned to the first brake pressure line 11 or the second brake pressure line 12, both upstream from the pressure amplifying value 41, by means of operation of the hydraulic pump 49. Although the pressure within the brake pressure lines 11 or 12 is maintained at the same high level as that generated within the master cylinder 1, the return of fluid pressure is forced by the high-pressure output of the hydraulic pump 49 powered by the motor 31.

Figure 2:
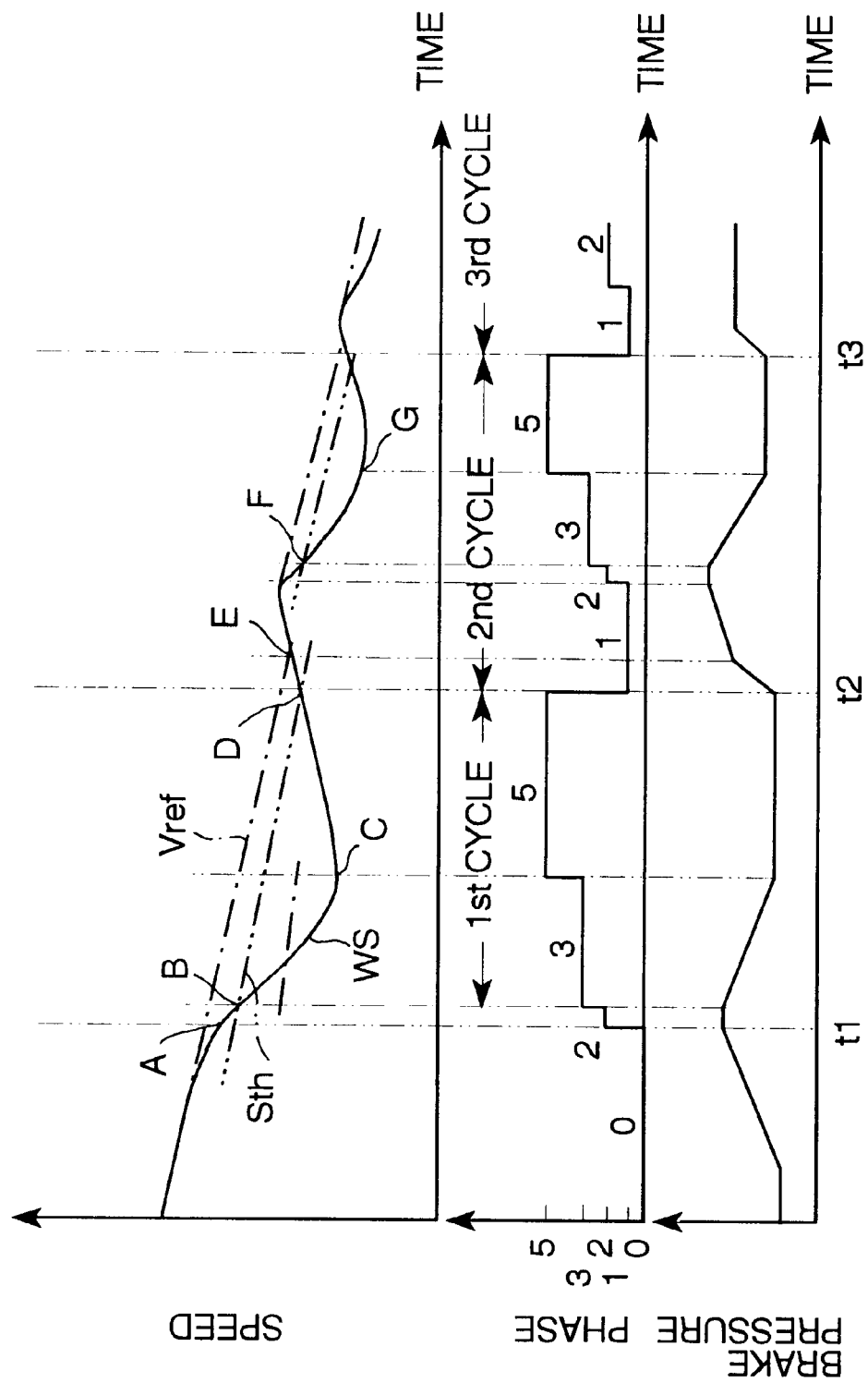
FIG. 2 is a time chart of the anti-lock brake control.

Referring to FIG. 2 which is a time chart showing the basic operation of the anti-lock braking control, the anti-lock braking control is executed utilizing five control phases, namely phase 0, phase 1, phase 2, phase 3 and phase 5. These phases defines control operation as follows:

Phase 0 (zero): the phase in which the anti-lock braking control is not executed;

Phase 1: the phase of increasing the brake pressure;

Phase 2: the phase in which the anti-lock braking control is no executed and the increased brake pressure is maintained;

Phase 3: the phase of reducing the brake pressure; and

Phase 5: the phase of maintaining the decreased brake pressure.

The value of slippage Sth, which denotes the tendency of wheel lock, and is used as a threshold level for commencement of the anti-lock braking control shown in FIG. 2, is defined, for example, by the following equation:

$$S=[(Vref-WS)/Vref]\times 100\%$$

where

Vref is the tentative vehicle speed; and

WS is the wheel speed.

Though the tentative vehicle speed may be estimated in well known manner, it is the simplest way to employ the highest wheel speed among the four wheels.

As shown by example in FIG. 2, Before a time t1 until which the anti-lock braking control is not applied, the speed of the braked wheel is becoming lower from the tentative vehicle speed with an increase in brake pressure. This decreasing wheel speed approaches a speed A by the time t1 where a decreasing rate of wheel speed attains a specified value for permitting execution of the anti-lock braking control. For a short period of time after the anti-lock braking control has commenced at the time t1, the brake pressure is still maintained. Even while the brake pressure is maintained, the wheel speed continues to decrease until it attains a speed B as a result of attaining the threshold level of slippage Sth. When the threshold level of slippage Sth is attained, the brake pressure starts to be reduced. The reduction in brake pressure lowers the decreasing rate of wheel speed to approximately 0 (zero) until the wheel speed reaches a speed C. When the decreasing rate of wheel speed approaches 0 (zero), the decreased brake pressure is maintained with the result of permitting the wheel speed to gradually rise to a speed D at which the wheel experiences again slippage at the threshold level of slippage Sth. The brake pressure is controlled to increase quickly immediately after the speed D is attained and gradually thereafter. As a result of the increase in brake pressure, the wheel speed approaches a speed A where a decreasing rate of wheel speed attains the specified value for permitting execution of the anti-lock braking control. After a short period of time for which the brake pressure is maintained, the wheel speed attains a speed F at which the threshold level of slippage Sth is caused. Subsequently, the brake pressure is decreased again. When the decreasing rate of wheel speed reaches approximately 0 (zero) as a result that the wheel speed reaches a speed G, the brake pressure is maintained at the lowered level.

In the basic operation of the anti-lock braking control, each cycle of control is defined between the end of Phase 5 in which reduced brake pressure is maintained and the end of following Phase 5. However, at the beginning of the anti-lock braking control, the cycle of control is defined between the commencement of Phase 2 in which increased brake pressure is maintained and the end of Phase 5. This is due to the fact that the anti-lock braking control is initiated from Phase 2.

The threshold level of slippage Sth varies when control phase changes according to road surface friction coefficient $\mu$, and is shown by example in following Table.

| Phase Change | 1 → 2 | 2 → 3 | 3 → 5 | 5 → 1 |
|---|---|---|---|---|
| Low | −0.5 G | 95% | 0 G | 95% |
| Med | −1.0 G | 90% | −0.2 G | 90% |
| High | −1.5 G | 85% | −0.2 G | 85% |

Figure 3:
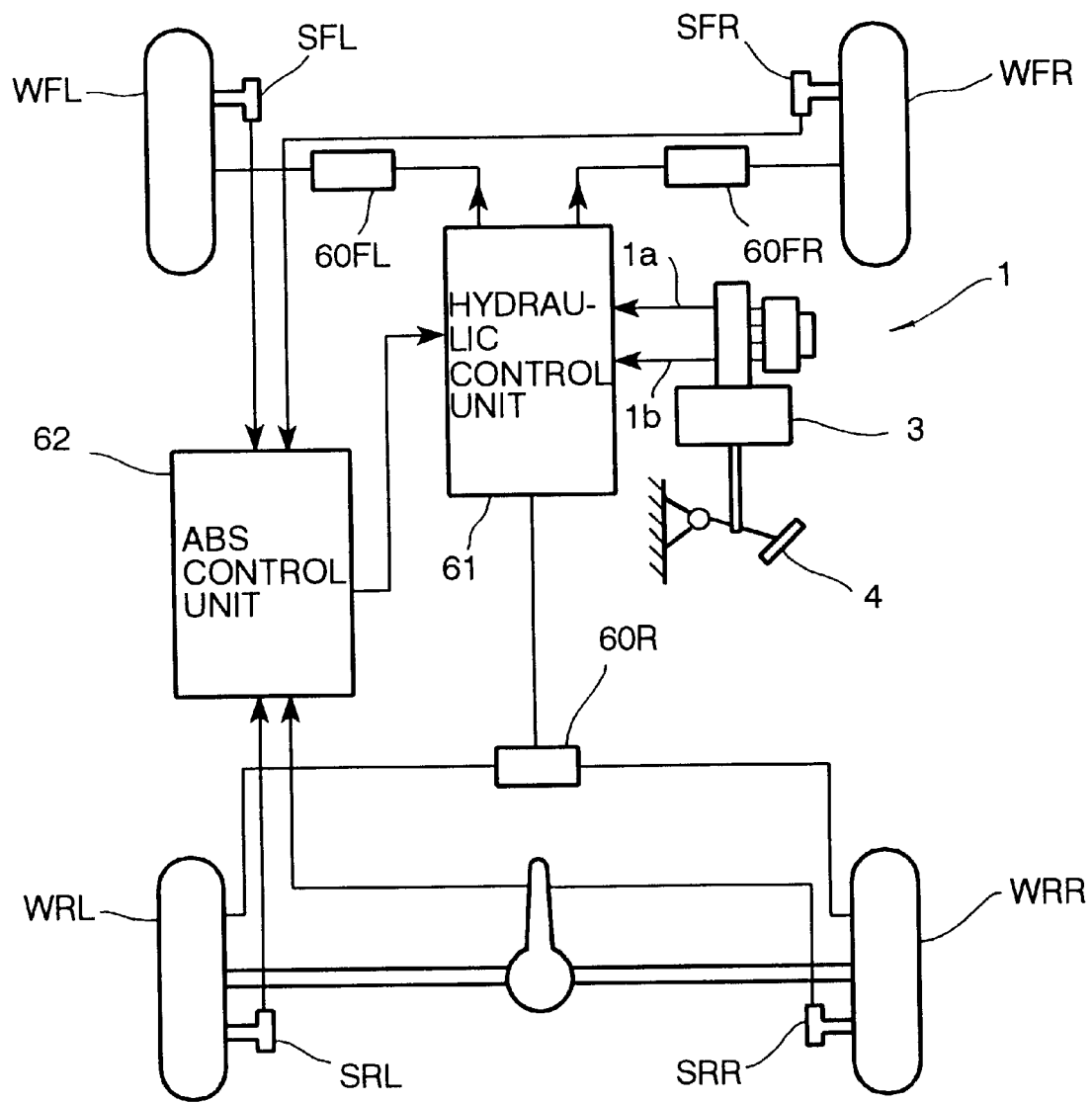
FIG. 3 is a schematic illustration of a vehicle equipped with an anti-lock brake control system of the invention.
Figure 4:
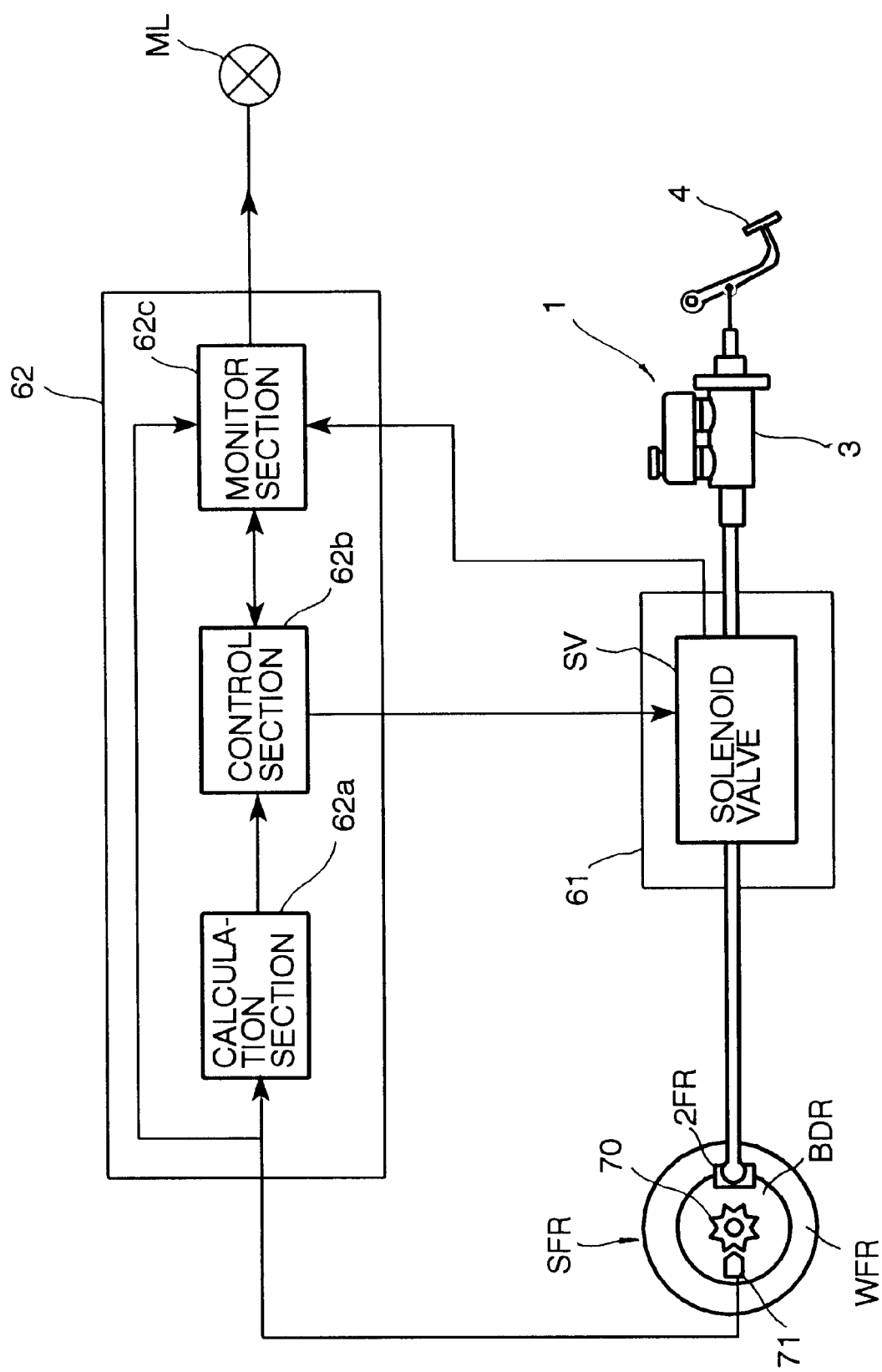
FIG. 4 is a functional block diagram of an anti-lock brake system in accordance with an embodiment of the invention.

FIGS. 3 and 4 show the structure of the anti-lock brake system. As shown in FIG. 3, the anti-lock brake system includes an ant-lock brake control unit 62 incorporating a microcomputer and wheel speed sensors SFL, SFR, SRL and SRR which are individually installed to left and right front wheels WFL and WFR and left and right rear wheels WRL and WRR, respectively. Each of the wheel speed sensors SFL, SFR, SRL and SRR is capable of monitoring the speed of corresponding wheel and outputs a speed signal to the ant-lock braking control unit 62. These wheel speed sensors may be of a pickup type that comprises a magnetic rotor 70 having a specific number of teeth on the external periphery and fixedly attached to the vehicle wheel and a pickup coil 71 installed in the vicinity of the magnetic rotor 70. The pickup coil 72 generates pulses one every time it is passed over by the tooth of the magnet rotor 70. Accordingly, the greater the number of pulses per unit time is, the higher the wheel speed is. The ant-lock braking control unit 62 sends control signals to the hydraulic control unit 61 which, as was described in connection with FIG. 1, includes the hydraulic circuits 60R, 60FL and 60FR.

Hydraulic control unit 61 responds to control signals to control brake pressure in the hydraulic circuits 60R, 60FL and 60FR in the various pressure control modes as was previously described, thereby appropriately regulating braking force for the front and rear wheels.

As shown in FIG. 4, the anti-lock brake control unit 62 is comprised of three sections, namely a computation section 62a, control section 62b and a monitoring section 62c. The computation section 62a executes calculations relating to vehicle speed, tentative vehicle speed, increasing or decreasing rate of wheel speed, and wheel slippage. The control section 62b sets a threshold level of slippage for controlling a reduction in brake pressure, and hence a reducing rate of wheel speed, determines road conditions such as split surface roads and road surface friction coefficients, determines control phases to be executed, sets control values in relation to the respective control phases, and outputs control signals to the solenoid valve SV in the hydraulic control unit 61. The monitoring section 62c monitors operational status of these computation section 62a and control section 62b. The monitoring section block 62c outputs a signal to activate an indicator lamp ML while the anti-lock brake control is in operation.

Figure 5:
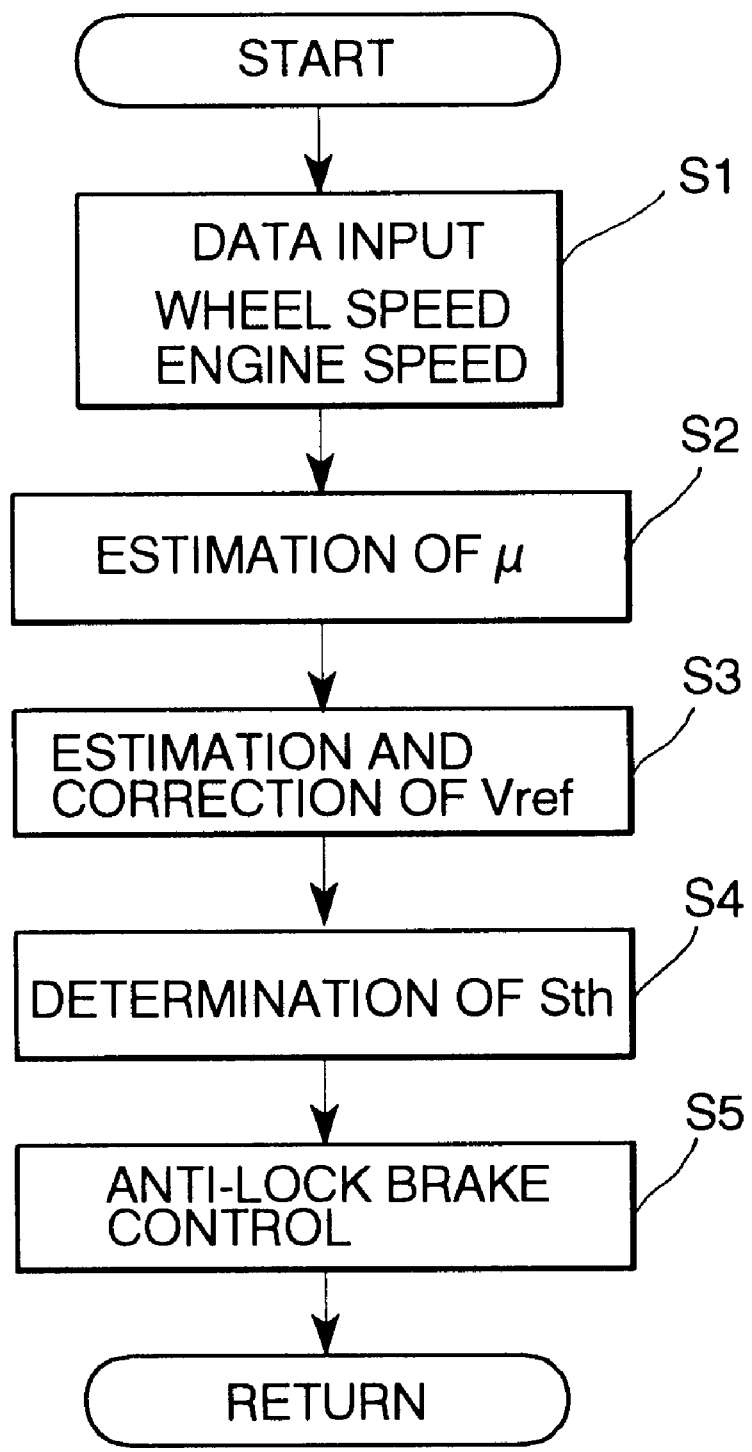
FIG. 5 is a flow chart illustrating a main sequence routine of the anti-lock brake control.

Referring to FIG. 5 which is a flow chart of a main sequence routine of the ant-lock braking control, when a main relay (F/S relay) of the anti-lock brake system turns ON, the ant-lock braking control unit 62 operates is caused to execute the ant-lock braking control. The flow chart logic commences and control passes directly to a function block at step S1 where various data are input into the control unit regarding wheel speed, engine speed, road conditions (split surface road, adverse road), brake pedal stepping force, steering angle, and so forth. The road surface friction coefficient of a road on which the vehicle is traversing is estimated based on wheel speeds WS obtained from wheel speed sensors SFL, SFR, SRL and SRR at step S2, and the vehicle speed Vref is tentatively estimated from, for example, the highest wheel speed WS obtained from among the four wheels and corrected at step S3. The vehicle speed correction is made during execution of what is called select-low braking control while the vehicle is traversing a split surface road which imposes different frictional force on the left and right rear wheels. The select-low braking control refers to the fact that the braking control of both left and rear wheels WRL and WRR is performed with equal brake pressure suitable to specific one of the rear wheels WRL and WRR which tends to lock due to a lower road surface friction coefficient $\mu$ more than the other or is experiencing tire torque lower than the other.

The 4-sensor, 3-channel type of anti-lock brake system delineated above executes independent control of the left and right front wheels WFL and WFR based on wheel speed monitored by the wheel speed sensors SFL and SFR, respectively, and, however, executes common control of the left and right rear wheels WRL and WRR based on consolidated data of wheel speeds from the wheel speed sensors SRL and SRR through the hydraulic control circuit 60R.

Because, as a result of this configuration, although the wheel speed is monitored independently at both left and right rear wheels WRL and WRR, the select-low braking control is certainly performed. Because the select-low braking control provides a reduction in yaw moment of the vehicle sufficient for the driver to control the tendency of the vehicle to turn through operation of the steering wheel, enhanced driving stability is realized.

However, because, in cases where, while the vehicle is traversing a split surface road which imposes different frictional force on the left and right rear wheels WRL and WRR, the select-low braking control is applied, the rear wheel suffering a smaller frictional force locks with a result of a reduction in brake pressure for each wheel and of an increase in the wheel speed of the driving wheel suffering the larger frictional force. As a result, because the vehicle speed is calculated based on the highest wheel speed, the remaining wheels, other than the driving wheel suffering the higher frictional force, are inappropriately judged to tend toward a lock and supplied with brake pressure possibly decreased in level below the necessary level needed for optimum control.

From the background described above, as will be demonstrated in the following embodiments, while the anti-lock braking control adjusts braking pressure supplied commonly to both rear wheels based on the wheel speed of the driving wheel suffering the smaller frictional force, it corrects the vehicle speed obtained as the highest wheel speed from among the front and rear wheels to a lower speed according to the difference between road surface friction coefficients imposed on the left and right rear wheels. The anti-lock brake system provides brake pressure control based on the vehicle speed which is calculated based on the highest one of wheel speeds of the front and rear wheels and corrected as appropriately as possible according to the difference between road surface friction coefficients imposed on the left and right rear wheels, so that it is prevented to make an inappropriate judgement that the wheels other than a specific driving wheel suffering frictional force higher than another driving wheel tend toward a lock due to an increase in the wheel speed of the specific driving wheel and to apply brake pressure decreased in level below the necessary level needed for optimum control to the remaining wheels other than the specific driving wheel, and consequently, more appropriate and desirable braking control is attained during traversing a split surface road.

After the vehicle speed Vref has been appropriately corrected at step S3, the threshold level of slippage Sth for the anti-lock braking control is determined at step S4. Lastly, the appropriate level to which the brake pressure is gradually or quickly increased or decreased is set at step S5 to execute the anti-lock braking control in the pattern such as shown in FIG. 2.

The correction to the vehicle speed made at step S4 is broadly interpreted as a correction of the vehicle speed estimated based on wheel speeds, a correction of the vehicle speed estimated based on corrected wheel speeds, and a correction of the vehicle speed estimated based on wheel speeds of wheels excluding specific one of the left and right rear wheels which bears a frictional resistance higher than another rear wheel and from which an inappropriate judgement occurs.

Figure 6:
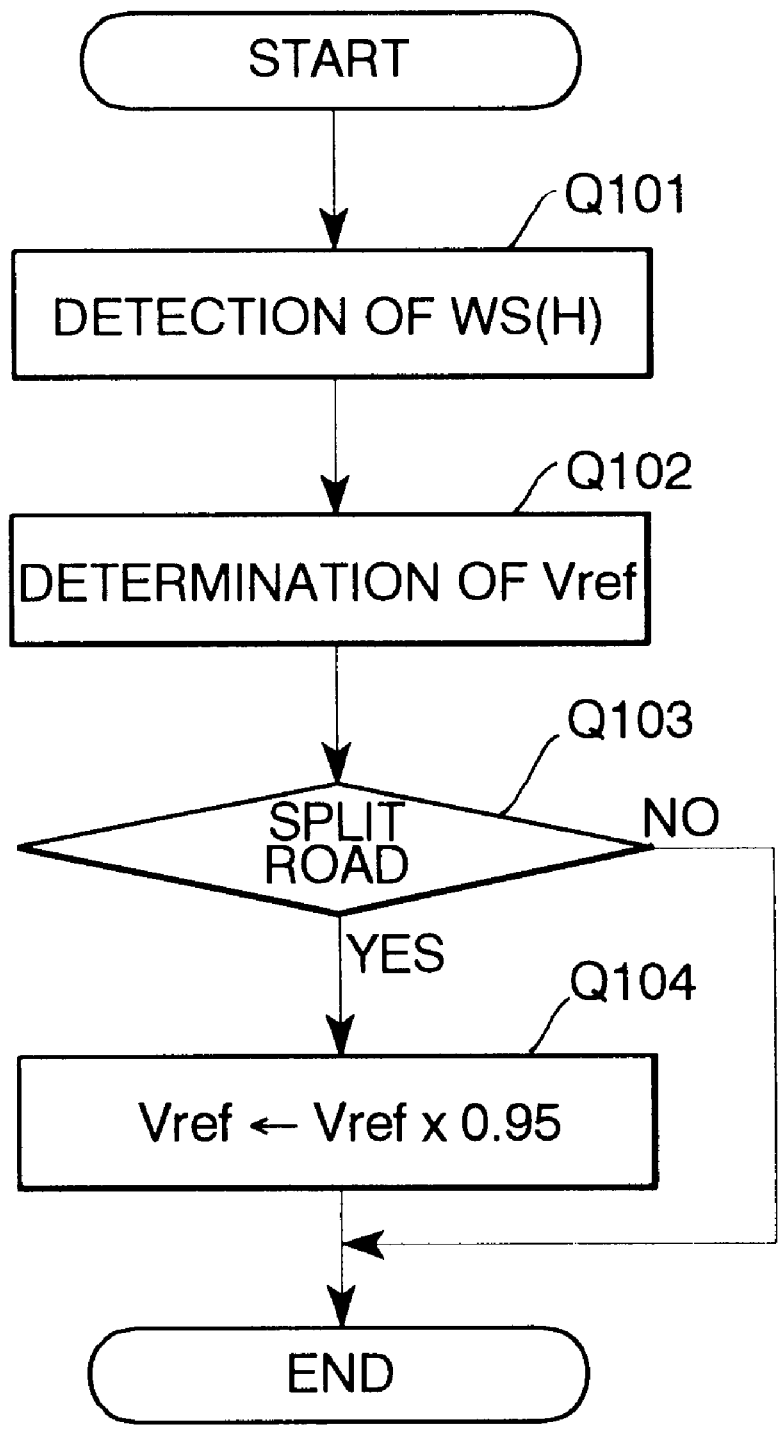
FIG. 6 is a flow chart illustrating a subroutine of the estimation and correction of vehicle speed in accordance with an embodiment of the invention.

FIG. 6 is a flow chart illustrating a vehicle speed correction subroutine called for at step S3 of the main routine. Prior to estimation of the tentative vehicle speed Vref utilized to control brake pressure, and hence brake power, the highest wheel speed WS(H) is detected from among wheel speeds represented by output from the wheel speed sensors SFR, SFL, SRL and SRR installed to the wheels WFR, WFL, WRL and WRR, respectively, at step Q101. Subsequently, at step Q102, a vehicle speed Vref is tentatively estimated based on the highest wheel speed WS(H). A determination is made at step Q103 as to whether the vehicle is traversing a split surface road or not. In this instance, the utilization is made of the difference between road surface friction coefficients which the left and right rear wheels WRL and WRR bear respectively, greater than a specified level as a basis for the determination.

In events where it is determined that the vehicle is traversing a split surface road, the vehicle speed Vref is corrected at step Q104 by multiplying the vehicle speed Vref by a specific speed reduction coefficient, for instance 0.95 in this embodiment, which is assigned according to the difference in road surface friction coefficients of the split surface road and is resultingly reduced 5%. The corrected vehicle Vref thus estimated is utilized in the calculation of the threshold level of slippage Sth as was explained previously in regard to the main routine shown in FIG. 2, and the anti-lock braking control is executed at step S6 of the main routine in the pattern shown in FIG. 5.

If the answer to the determination made at step Q103 is negative, the vehicle speed Vref is utilized as it is to calculate the threshold level of slippage Sth without being subjected to the reduction correction.

By means of the vehicle speed correction, the brake control system enables it to prevent an unnecessary reduction in brake pressure to the three wheels, other than the specific rear wheel which bears a higher frictional resistance, resulting from an appropriate judgement that the remaining three wheels tend toward a lock, thereby applying an appropriate braking force to the wheels while the vehicle is traversing even a split surface road.

Figure 7:
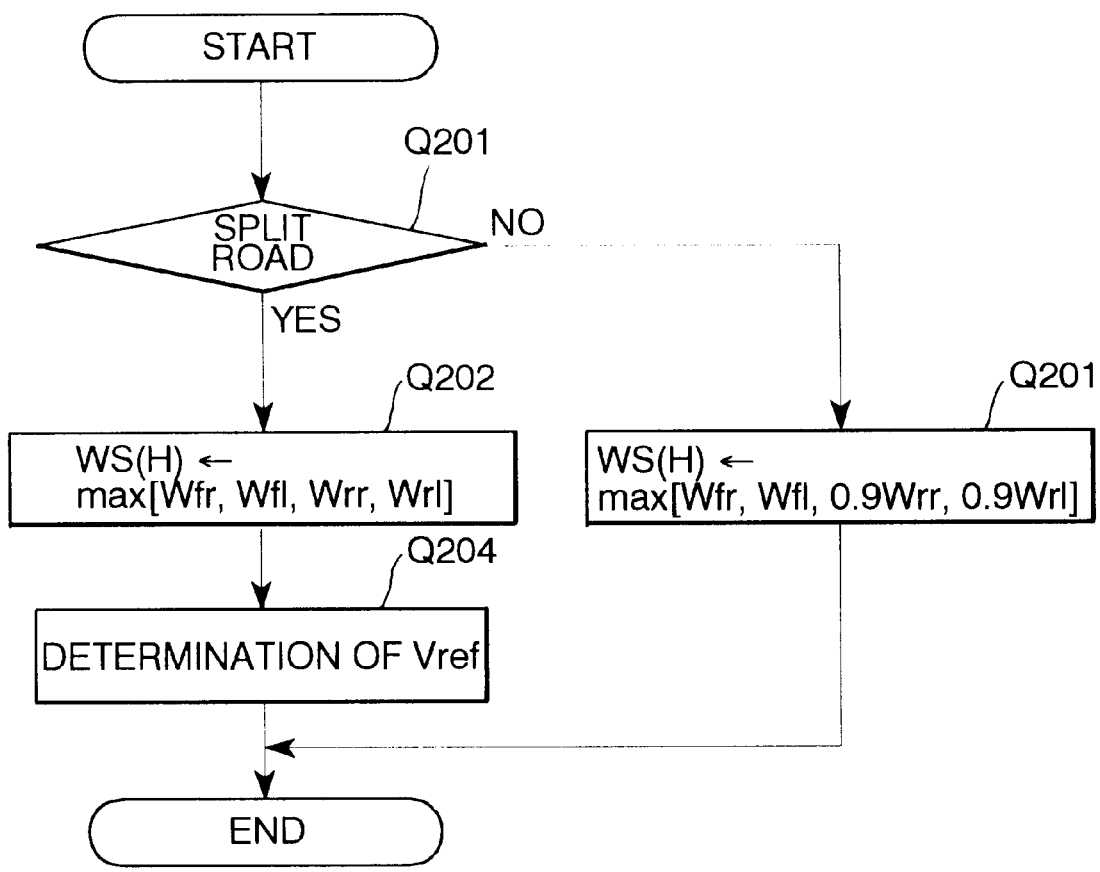
FIG. 7 is a flow chart illustrating a subroutine of the estimation and correction of vehicle speed in accordance with another embodiment of the invention.

FIG. 7 is a flow chart showing a variation of the vehicle speed correction subroutine called for at step S3 of the main routine. This vehicle speed correction subroutine differs from that shown in FIG. 6 in that a determination as to whether the vehicle is traversing a split surface road which has different road surface frictional coefficients $\mu$ greater than a specified road surface frictional coefficient $\mu_0$ between the left and right rear wheels is executed at step Q201 before the highest wheel speed WS(H) is estimated. If the vehicle is judged to be not traversing a split surface road, the highest wheel speed among the wheel speeds Wfl, Wfr, Wrl and Wrr of the front and rear wheels WFL, WFR, WRL and WRR is estimated as the vehicle speed at step Q202. The vehicle speed Vref is obtained from the highest wheel speed WS(H) at step Q204.

If the vehicle is judged to be traversing a split surface road at step Q201, the speed reduction correction is applied to the wheel speeds of the left and right rear wheels WRL and WRR according to the difference of the road surface friction coefficients $\mu$ of the split surface road, and the highest wheel speed among the wheel speeds Wfl, Wfr, Wrl and Wrr after reduction correction is estimated as the vehicle speed at step Q203. At step Q204, the vehicle speed Vref is obtained from the highest wheel speed WS(H) at step Q204.

By means of the correction of rear wheel speeds before estimation of the vehicle speed, more accurate estimation of the vehicle speed is enabled.

Figure 8:
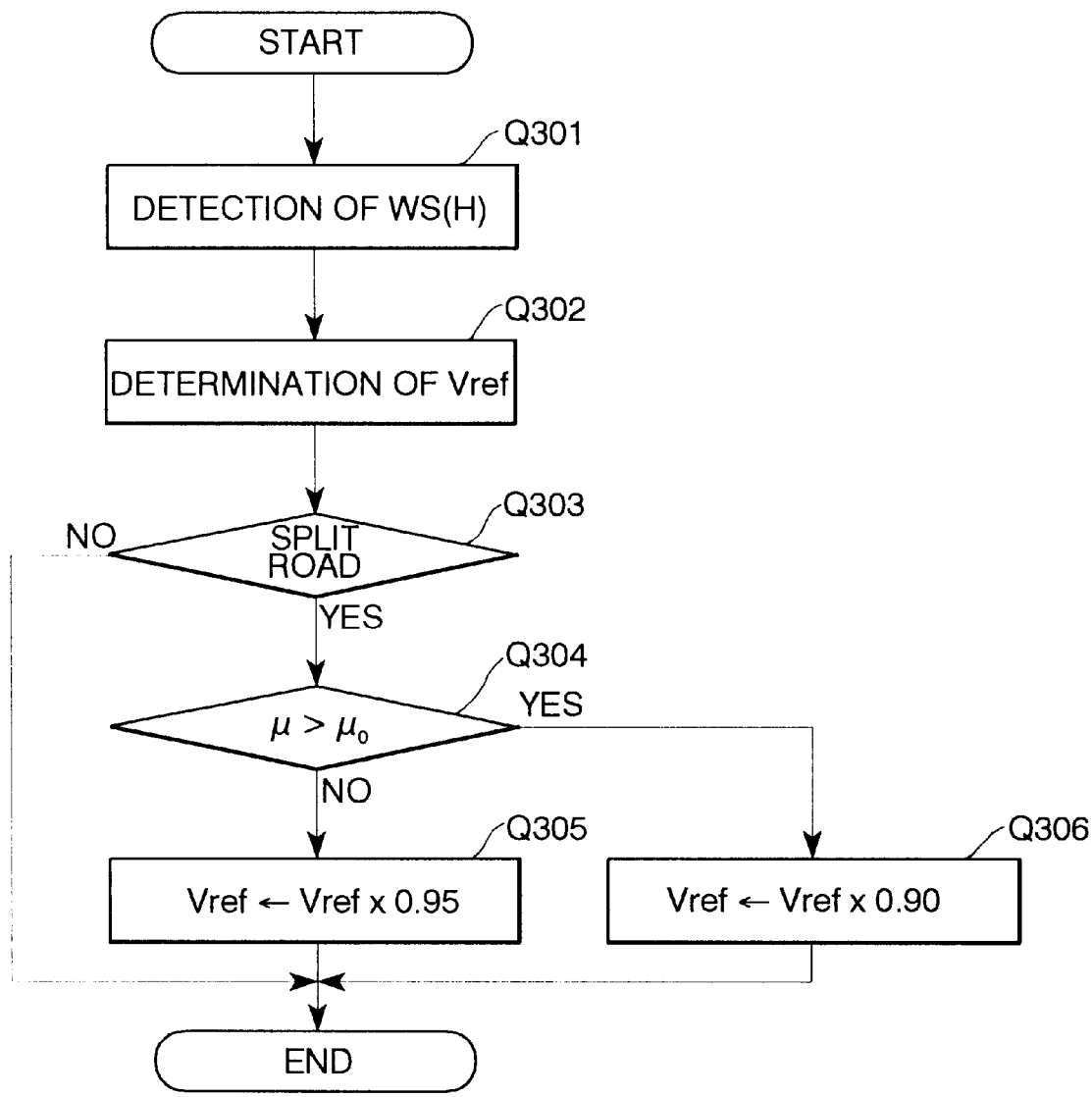
FIG. 8 is a flow chart illustrating a subroutine of the estimation and correction of vehicle speed in accordance with another embodiment of the invention.

The vehicle speed correction subroutine may varied as illustrated by a flow chart in FIG. 8. After estimation of the vehicle speed at step Q302 based on the highest wheel speed detected from among those of the wheels WFL, WFR, WRL and WRR at step Q301, a determination is made at step Q303 as to whether the vehicle is traversing a split surface road which has different road surface frictional coefficients $\mu$ between the left and right rear wheels. If the answer to the determination is affirmative, this indicates that the vehicle is traversing a split surface road surface, then, a determination is made at step Q304 as to whether the difference in surface frictional coefficients $\mu$ at the left and right rear wheels is greater than a specified level $\mu_0$. If the answer to the decision is negative, a corrective reduction coefficient of 0.95 is applied to the vehicle speed Vref at step Q305. On the other hand, if answer to the decision is negative, a corrective reduction coefficient of 0.90 is applied to the vehicle speed Vref at step Q306. In this manner, the vehicle speed Vref, based on which the threshold level of slippage Sth is calculated, is reduced 5% or 10% according to the difference in surface frictional coefficient $\mu$ at the left and right rear wheels.

If the answer to the determination made at step Q303 is negative, this indicates that the vehicle is not traversing a split surface road, then, the vehicle speed Vref estimated based directly on the highest wheel speed at step Q302 is employed as it is to calculate the threshold level of slippage Sth.

Figure 9:
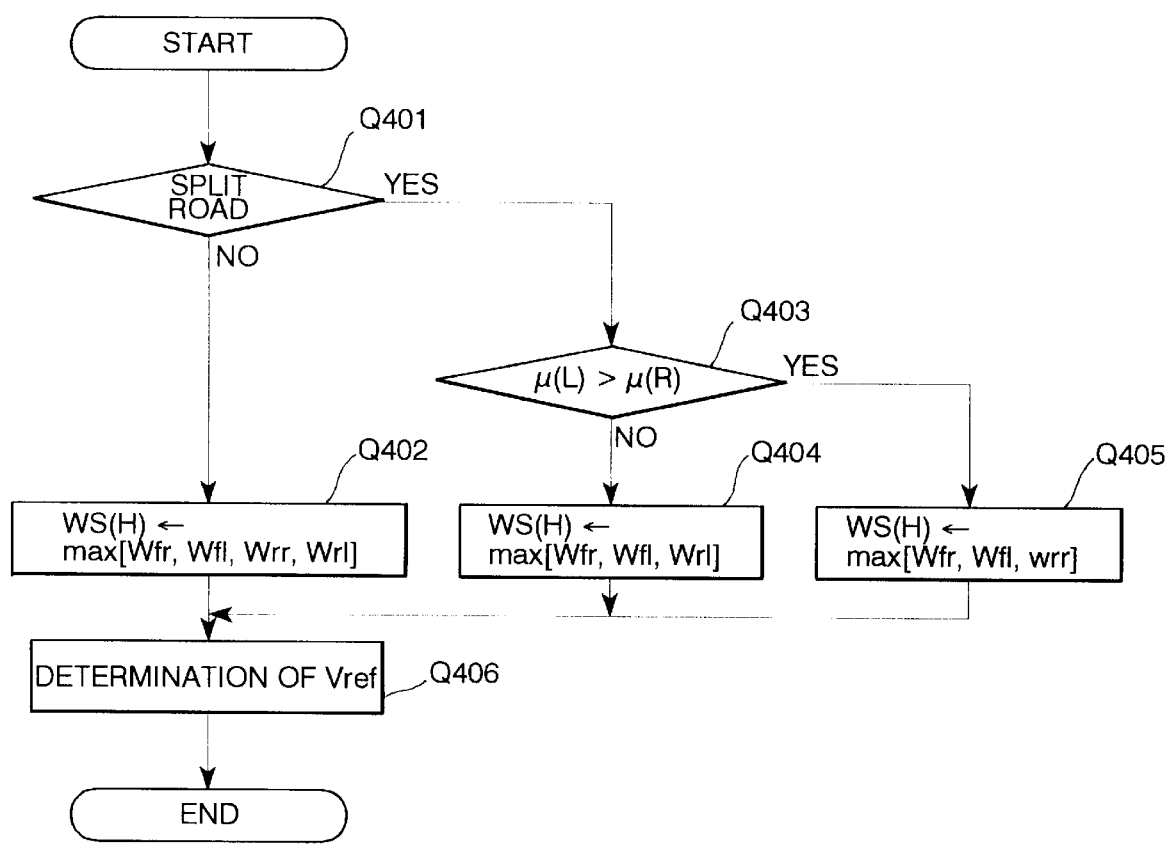
FIG. 9 is a flow chart illustrating a subroutine of the estimation and correction of vehicle speed in accordance with still another embodiment of the invention.

The vehicle speed correction subroutine may varied as illustrated by a flow chart in FIG. 9. A determination is made at step Q401 as to whether the vehicle is traversing a split surface road having a difference in road surface frictional coefficient $\mu$ at the left and right rear wheels exceeding a specific level. If the answer to the determination is negative, this indicates that the vehicle is not traversing a split surface road, then, the highest wheel speed is selected from among wheel speeds of all of the front and rear wheels Wfr, Wfl, Wrr and Wrl at step Q402. If the answer to the determination is affirmative, this indicates that the vehicle is traversing a split surface road, another decision is made at step Q403 as to whether the road surface frictional coefficient $\mu(L)$ at the left rear wheel Wrl is higher than that $\mu(R)$ at the right rear wheel Wrr. If the road surface frictional coefficient $\mu(R)$ at the right rear wheel Wrr is higher than that $\mu(L)$ at the left rear wheel Wrl, the speed of the right rear wheel Wrr is disregarded in selection of the highest wheel speed at step Q404. On the other hand, if the road surface frictional coefficient $\mu(L)$ at the left rear wheel Wrl is higher than that $\mu(R)$ at the right rear wheel Wrr, the speed of the left rear wheel Wrl is disregarded in selection of the highest wheel speed at step Q405. Based on the highest wheel speed selected at step Q402, Q404 or Q405, the vehicle speed Vref is estimated at step Q406.

Figure 10:
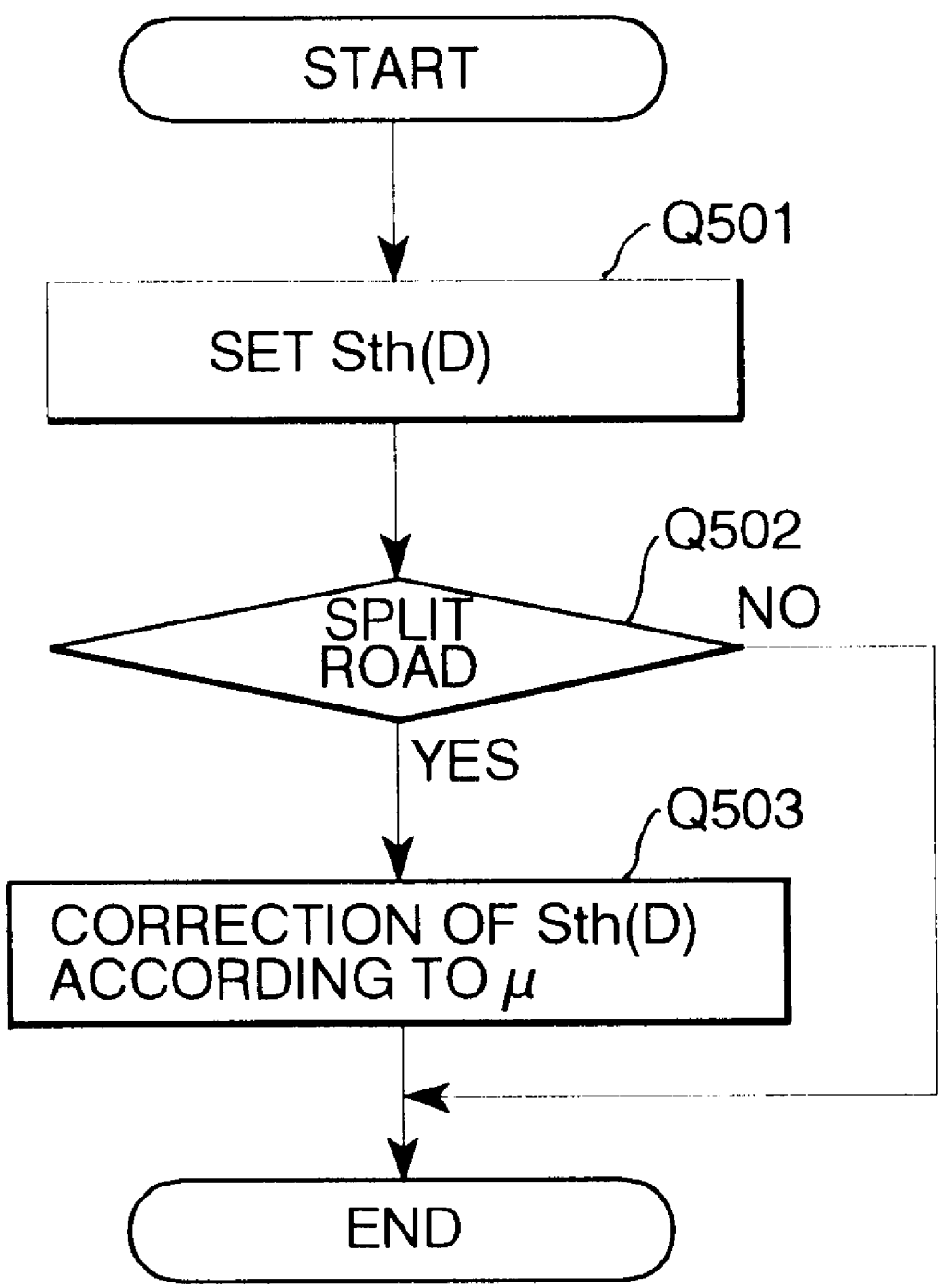
FIG. 10 is a flow chart illustrating a subroutine of the correction of the threshold level of slippage in accordance with an embodiment of the invention.

FIG. 10 is a flow chart illustrating a subroutine of establishing the threshold level of slippage Sth(D) for defining a point to start corrective control of braking force during execution of the anti-lock braking control. The threshold level of slippage Sth(D) is corrected to a higher level when the vehicle is traversing a split surface road surface in order to start timely the restrictive control of braking force. Through this correction of the threshold level of slippage Sth(D), more effective braking control is attained without an excessive reduction in braking force.

After having normally set a threshold level of slippage Sth(D), which defines a point to start restrictive control of braking force, according to a wheel speed and a vehicle speed at step Q501, a determination is made at step Q502 as to whether the vehicle is traversing a split surface road which imposes different road surface frictional coefficients exceeding a specific level on the left and right rear wheels. If the answer to the determination is negative, this indicates that the vehicle is not traversing a split surface road, then, the threshold level of slippage Sth(D) is employed as it is as a starting point of the restrictive control of braking force. On the other hand, if the answer to the determination is affirmative, this indicates that the vehicle is traversing a split surface road, then, the threshold level of slippage Sth(D) is corrected to a higher level according, for example, to the difference in road surface frictional coefficient at the left and right rear wheels.

Through any embodiment or variation of the ant-lock braking control described above, excessively lowering of braking force is prevented through the select-low braking control when the vehicle is traversing a split surface road, and appropriate control of anti-lock braking is realized.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A brake control system for an automotive vehicle which applies braking force commonly to both left and right wheels of one of front and rear couples and controls braking force to be applied to any specific one of wheels of said front and rear couples when said specific wheel causes a specified speed difference from a vehicle speed, said brake control system comprising:

speed monitoring means for monitoring a wheel speed of each said wheel; and control means for determining a vehicle speed based on the greatest speed among said wheel speeds of said wheels and road surface friction coefficients based on said wheel speeds of said wheels, respectively, varying said vehicle speed according to a difference between said road surface friction coefficients of said left and right wheels so as to decrease said vehicle speed as said difference between said road surface friction coefficients increases, and controlling braking force to a specific one of said wheels which causes a specified speed difference from said vehicle speed that has decreased.

2. The brake control system as defined in claim 1, wherein said control means varies said vehicle speed only when said difference between said road surface friction coefficients is greater than a specified level.

3. A brake control system as defined in claim 1, wherein said one of front and rear couples is a front couple of driving wheels.

4. A brake control system for an automotive vehicle which applies braking force commonly to both left and right wheels of one of front and rear couples and controls braking force to be applied to any specific one of wheels of said front and rear couples when said specific wheel causes a specified speed difference from a vehicle speed, said brake control system comprising:

speed monitoring means for monitoring a wheel speed of each said wheel; and control means for determining a vehicle speed based on the greatest speed among said wheel speeds of said wheels and road surface friction coefficients based on said wheel speeds of said wheels, respectively, execution control of said braking force to a specific one of said wheels which causes a specified speed difference from said vehicle speed, and increasing said specified speed difference when a difference is caused between said road surface friction coefficients of said left and right wheels greater than a specified level.

5. A brake control system for an automotive vehicle which applies braking force commonly to both left and right wheels of one of front and rear couples and controls braking force to be applied to a specific one of wheels of said front and rear couples when said specific wheel causes a specified speed difference from a vehicle speed, said brake control system comprising:

speed monitoring means for monitoring a wheel speed of each said wheel; and control means for determining a road surface friction coefficient of each said wheel based on said wheel speed of each said wheel, decreasing said wheel speed of a specific one of said left and right wheels which has said road surface friction coefficient greater than the other wheel as a difference between said road surface friction coefficients of said left and right wheels becomes greater when said difference between said road surface friction coefficients of said left and right wheels is higher than a specified level, determining a vehicle speed based on said decreased wheel speed and said wheel speed of said other wheel when said difference between said road surface friction coefficients of said left and right wheels is higher than said specified level, and controlling braking force to a specific one of said wheels which causes a specified speed difference from said vehicle speed.

6. A brake control system for an automotive vehicle which applies braking force commonly to both left and right wheels of one of front and rear couples and controls braking force to be applied to a specific one of wheels of said front and rear couples when said specific wheel causes a specified speed difference from a vehicle speed, said brake control system comprising:

speed monitoring means for monitoring a wheel speed of each said wheel; and control means for determining a road surface friction coefficient of each said wheel based on said wheel speed of each said wheel, determining a vehicle speed based on said wheel speeds of said wheels excepting said wheel speed of a specific one of left and right wheels which has said road surface friction coefficient greater than the other wheel when a difference between said road surface friction coefficients of said left and right wheels higher than said specified level is caused, and controlling braking force to a specific one of said wheels which causes a specified speed difference from said vehicle speed.

7. A brake control system as defined in claim 6, wherein said one of front and rear couples is a front couple of driving wheels.

8. A brake control system for an automotive vehicle which applies braking force commonly to both left and right driving wheels and independently to left and right driven wheels and controls braking force to be applied to a specific one of driving and driven wheels when said specific wheel causes a specified speed difference from a vehicle speed, said brake control system comprising:

speed monitoring means for monitoring a wheel speed of each said wheel; and control means for determining a road surface friction coefficient of each said wheel based on said wheel speed of each said wheel, decreasing said wheel speed of a specific one of said left and right driving wheels which has said road surface friction coefficient greater than the other wheel according to a difference between said road surface friction coefficients of said left and right driving wheels as said difference between said road surface friction coefficients of said left and right driving wheels increases when said difference between said road surface friction coefficients of said left and right driving wheels higher than a specified level is caused, determining a vehicle speed based on said wheel speeds of said specific driving wheel that has been decreased and said wheel speeds of the remaining wheel when said difference between said road surface friction coefficients of said left and right wheels higher than said specified level is caused, and controlling braking force to a specific one of said driving and driven wheels which causes a specified speed difference from said vehicle speed.

9. A brake control system for an automotive vehicle which applies braking force commonly to both left and right driving wheels and independently to left and right driven wheels and controls braking force to be applied to a specific one of driving and driven wheels when said specific wheel causes a specified speed difference from a vehicle speed, said brake control system comprising:

speed monitoring means for monitoring a wheel speed of each said wheel; and control means for determining a road surface friction coefficient of each said wheel based on said wheel speed of each said wheel, determining a vehicle speed based on said wheel speeds of said wheels excepting said wheel speed of a specific one of left and right driving wheels which has said road surface friction coefficient greater than the other driving wheel when a difference between said road surface friction coefficients of said left and right wheels higher than a specified level is caused, and controlling braking force to a specific one of said wheels which causes a specified speed difference from said vehicle speed.

* * * * *